(12) United States Patent
Fisher et al.

(10) Patent No.: US 9,947,947 B2
(45) Date of Patent: Apr. 17, 2018

(54) MIXED METAL BOROHYDRIDES

(71) Applicant: Intelligent Energy Inc., San Jose, CA (US)

(72) Inventors: Allison M. Fisher, Cocoa, FL (US); Brian Elliot Hayden, Lyndhurat (GB); Jean-Philipe Soulie, Southsea (GB)

(73) Assignee: INTELLIGENT ENERGY INC., San Jose, CA (US)

( * ) Notice: Subject to any disclaimer, the term of this patent is extended or adjusted under 35 U.S.C. 154(b) by 226 days.

(21) Appl. No.: 14/629,317

(22) Filed: Feb. 23, 2015

(65) Prior Publication Data
US 2015/0166336 A1 Jun. 18, 2015

Related U.S. Application Data

(63) Continuation of application No. PCT/US2013/054478, filed on Aug. 12, 2013.

(60) Provisional application No. 61/717,172, filed on Oct. 23, 2012, provisional application No. 61/782,443, filed on Mar. 14, 2013, provisional application No. 61/692,390, filed on Aug. 23, 2012.

(51) Int. Cl.
| | |
|---|---|
| *C01B 3/00* | (2006.01) |
| *H01M 8/04082* | (2016.01) |
| *C01B 35/00* | (2006.01) |
| *C01B 6/23* | (2006.01) |

(52) U.S. Cl.
CPC .......... *H01M 8/04216* (2013.01); *C01B 6/23* (2013.01); *C01B 35/00* (2013.01)

(58) Field of Classification Search
CPC ..................................................... C01B 6/23
See application file for complete search history.

(56) References Cited

U.S. PATENT DOCUMENTS

| | | | |
|---|---|---|---|
| 2,963,405 A * | 12/1960 | Seemuller | A61K 8/11 |
| | | | 106/272 |
| 2,968,523 A | 1/1961 | Cunningham et al. | |
| 2005/0191232 A1* | 9/2005 | Vajo | C01B 3/0026 |
| | | | 423/648.1 |
| 2009/0209409 A1* | 8/2009 | Soloveichik | B01J 31/121 |
| | | | 502/151 |

FOREIGN PATENT DOCUMENTS

WO 2009-022108 2/2009

OTHER PUBLICATIONS

A. Nale: 11 Universi a degl i Studi di Milano-Bicocca Facol a di Scienze MM Synthesis and characterization of Mg—Al—Ni alloys and Li—Mg borohydrides for hydrogen storage Jan. 21, 2011 (Jan. 21, 2011). pp. 1-91. XP055091307, Retrieved from the Internet: URL:http:jjboa.unimib.it/bitstream/10281/19621/3/Phd unimib 602367.pdf [retrieved-on Dec. 3, 2013].
A. Nale: Synthesis and characterization of Mg—Al—Ni alloys and Li—Mg borohydrides for hydrogen storage Jan. 21, 2011 (Jan. 21, 2011), Retrieved from the Internet: URL:http:jjboa.unimib.it/ handle/10281/1962 Up3ky6y198E [retrieved on Dec. 3, 2013].
Angeloclaudio Nale et al: On the decomposition of the 0.6LiBH— 0.4Mg(BH)eutectic mixture for hydrogen storage, International Journal of Hydrogen Energy. Elsevier Science Publishers B.V.• Barking. GB, vol. 36. No. 21, Aug. 3, 2011 (Aug. 3, 2011). pp. 13676-13682. XP028391325. ISSN: 0360-3199, DOI:10.1016/J. IJHYDENE.2011.08.009 [retrieved on Aug. 9, 2011] p. 13677.
International Search Report dated Dec. 3, 2013, issued in International patent application PCT/US2013/054478.

* cited by examiner

*Primary Examiner* — Peter F Godenschwager
(74) *Attorney, Agent, or Firm* — Baker & Hostetler LLP

(57) ABSTRACT

The invention relates to mixed metal borohydrides used for solid hydrogen storage. The mixed metal borohydrides are synthesized through solution synthesis using multiple metal borohydrides. First and second precursor solutions are prepared and combined to create a mixture in which the mixed metal borohydride is formed. The solvent is removed, leaving the mixed metal borohydride. The first precursor solution consisting essentially of lithium borohydride, and the second precursor solution consisting essentially of a borohydride compound containing one or more metal cations selected from the group of metals consisting of sodium, magnesium, calcium and titanium.

17 Claims, 6 Drawing Sheets

| Precursor | MWt | Total Moles H | Wt% H$_2$ | Group |
|---|---|---|---|---|
| LiBH$_4$ | 21.784 | 4 | 18.4 | A |
| NaBH$_4$ | 37.833 | 4 | 10.6 | A |
| KBH$_4$ | 53.941 | 4 | 7.4 | A |
| Mg(BH$_4$)$_2$ | 53.991 | 8 | 14.8 | B |
| Ca(BH$_4$)$_2$ | 69.764 | 8 | 11.5 | B |
| B(BH$_4$)$_3$ | 55.340 | 12 | 21.7 | C |
| Al(BH$_4$)$_3$ | 71.511 | 12 | 16.8 | C |
| Sc(BH$_4$)$_3$ | 89.485 | 12 | 13.4 | |
| Ti(BH$_4$)$_3$ | 92.396 | 12 | 13.0 | |
| V(BH$_4$)$_3$ | 110.312 | 12 | 10.9 | |
| Mn(BH$_4$)$_2$ | 84.624 | 8 | 9.5 | |
| Mn(BH$_4$)$_3$ | 99.467 | 12 | 12.1 | |
| Zn(BH$_4$)$_2$ | 95.076 | 8 | 8.4 | D |
| Zr(BH$_4$)$_4$ | 150.596 | 16 | 10.6 | |
| Cr(BH$_4$)$_3$ | 96.529 | 12 | 12.4 | |
| Fe(BH$_4$)$_2$ | 85.536 | 8 | 9.4 | |
| Co(BH$_4$)$_2$ | 88.616 | 8 | 9.0 | |
| Ni(BH$_4$)$_2$ | 88.376 | 8 | 9.1 | |
| Cu(BH$_4$) | 78.393 | 4 | 5.1 | |

FIG. 2A

| Compound | Precursors | MWt | Total Moles H | Wt% H$_2$ |
|---|---|---|---|---|
| Li$_3$Al(BH$_4$)$_6$ | A+C: 3LiBH$_4$/Al(BH$_4$)$_3$ | 136.863 | 24 | 17.5 |
| Li$_4$Al$_3$(BH$_4$)$_{13}$ | A+C: 4LiBH$_4$/3Al(BH$_4$)$_3$ | 301.669 | 52 | 17.2 |
| LiAl(BH$_4$)$_4$ | A+C: LiBH$_4$/Al(BH$_4$)$_3$ | 93.295 | 16 | 17.1 |
| Li$_3$Mg(BH$_4$)$_5$ | A+B: 3LiBH$_4$/Mg(BH$_4$)$_2$ | 119.343 | 20 | 16.8 |
| Li$_2$Mg(BH$_4$)$_4$ | A+B: 2LiBH$_4$/Mg(BH$_4$)$_2$ | 97.559 | 16 | 16.4 |
| AlMg(BH$_4$)$_5$ | B+C: Mg(BH$_4$)$_2$/Al(BH$_4$)$_3$ | 125.502 | 20 | 15.9 |
| LiMg(BH$_4$)$_3$ | A+B: LiBH$_4$/Mg(BH$_4$)$_2$ | 75.775 | 12 | 15.8 |
| Li$_2$NaAl(BH$_4$)$_6$ | A+C: 2LiBH$_4$/NaBH$_4$/Al(BH$_4$)$_3$ | 152.912 | 24 | 15.7 |
| Li$_3$Ti(BH$_4$)$_6$ | A+D: 3LiBH$_4$/Ti(BH$_4$)$_3$ | 157.761 | 24 | 15.2 |
| Li$_2$NaMg(BH$_4$)$_5$ | A+B: 2LiBH$_4$/NaBH$_4$/Mg(BH$_4$)$_2$ | 135.392 | 20 | 14.8 |
| Li$_2$Ti(BH$_4$)$_5$ | A+D: 2LiBH$_4$/Ti(BH$_4$)$_3$ | 135.977 | 20 | 14.7 |
| NaAl(BH$_4$)$_4$ | A+C: NaBH$_4$/Al(BH$_4$)$_3$ | 109.344 | 16 | 14.6 |
| Mg$_4$Ti(BH$_4$)$_{11}$ | B+D: 4Mg(BH$_4$)$_2$/Ti(BH$_4$)$_3$ | 308.373 | 44 | 14.3 |
| LiNa$_2$Al(BH$_4$)$_6$ | A+C: LiBH$_4$/2NaBH$_4$/Al(BH$_4$)$_3$ | 168.961 | 24 | 14.2 |
| LiTi(BH$_4$)$_4$ | A+D: LiBH$_4$/Ti(BH$_4$)$_3$ | 114.193 | 16 | 14.0 |
| MgTi(BH$_4$)$_5$ | B+D: Mg(BH$_4$)$_2$/Ti(BH$_4$)$_3$ | 164.400 | 20 | 13.7 |
| LiNa$_2$Mg(BH$_4$)$_5$ | A+B: LiBH$_4$/2NaBH$_4$/Mg(BH$_4$)$_2$ | 151.441 | 20 | 13.2 |
| NaMg(BH$_4$)$_3$ | A+B: NaBH$_4$/Mg(BH$_4$)$_2$ | 91.824 | 12 | 13.1 |

FIG. 2B

| Precursor | Group | Generic Group Formula |
|---|---|---|
| $Li(BH_4)_{1-x}(AlH_4)_x$ | A | $M1^{1+}(BH_4)_{1-x}(AlH_4)_x$<br>$X = 0, 1$ |
| $Na(BH_4)_{1-x}(AlH_4)_x$ | | |
| $K(BH_4)_{1-x}(AlH_4)_x$ | | |
| $Mg(BH_4)_{2-x}(AlH_4)_x$ | B | $M2^{2+}(BH_4)_{2-x}(AlH_4)_x$<br>$X = 0, 1, 2$ |
| $Ca(BH_4)_{2-x}(AlH_4)_x$ | | |
| $B(BH_4)_{3-x}(AlH_4)_x$ | C | $M3^{3+}(BH_4)_{3-x}(AlH_4)_x$<br>$X = 0, 1, 2, 3$ |
| $Al(BH_4)_{3-x}(AlH_4)_x$ | | |
| $Sc(BH_4)_{3-x}(AlH_4)_x$ | D1 | $M4^{3+}(BH_4)_{3-x}(AlH_4)_x$<br>$X = 0, 1, 2, 3$ |
| $Ti(BH_4)_{3-x}(AlH_4)_x$ | | |
| $Cr(BH_4)_{3-x}(AlH_4)_x$ | | |
| $Mn(BH_4)_{3-x}(AlH_4)_x$ | | |
| $V(BH_4)_{3-x}(AlH_4)_x$ | | |
| $Zr(BH_4)_{4-x}(AlH_4)_x$ | D2 | $M4^{4+}(BH_4)_{4-x}(AlH_4)_x$<br>$X = 0, 1, 2, 3, 4$ |
| $Mn(BH_4)_{2-x}(AlH_4)_x$ | D3 | $M4^{2+}(BH_4)_{2-x}(AlH_4)_x$<br>$X = 0, 1, 2$ |
| $Fe(BH_4)_{2-x}(AlH_4)_x$ | | |
| $Co(BH_4)_{2-x}(AlH_4)_x$ | | |
| $Ni(BH_4)_{2-x}(AlH_4)_x$ | | |
| $Zn(BH_4)_{2-x}(AlH_4)_x$ | | |

FIG. 3A

| Precursor Combination | Generic Complex Hydride Formula | |
|---|---|---|
| A + B | $M1^{1+}M2^{2+}(BH_4)_{(1-x)+(2-y)}(AlH_4)_{x+y}$ | X = 0,1; Y = 0,1,2 |
| A + C | $M1^{1+}M3^{3+}(BH_4)_{(1-x)+(3-y)}(AlH_4)_{x+y}$ | X = 0,1; Y = 0,1,2,3 |
| B + C | $M2^{2+}M3^{3+}(BH_4)_{(2-x)+(3-y)}(AlH_4)_{x+y}$ | X = 0,1,2; Y = 0,1,2,3 |
| A + D1 | $M1^{1+}M4^{3+}(BH_4)_{(1-x)+(3-y)}(AlH_4)_{x+y}$ | X = 0,1; Y = 0,1,2,3 |
| B + D1 | $M2^{2+}M4^{3+}(BH_4)_{(2-x)+(3-y)}(AlH_4)_{x+y}$ | X = 0,1,2; Y = 0,1,2,3 |
| C + D1 | $M3^{3+}M4^{3+}(BH_4)_{(3-x)+(3-y)}(AlH_4)_{x+y}$ | X = 0,1,2; Y = 0,1,2,3 |
| A + D2 | $M1^{1+}M4^{4+}(BH_4)_{(1-x)+(4-y)}(AlH_4)_{x+y}$ | X = 0,1, Y = 0,1,2,3,4 |
| B + D2 | $M2^{2+}M4^{4+}(BH_4)_{(2-x)+(4-y)}(AlH_4)_{x+y}$ | X = 0,1,2; Y = 0,1,2,3,4 |
| C + D2 | $M3^{3+}M4^{4+}(BH_4)_{(3-x)+(4-y)}(AlH_4)_{x+y}$ | X = 0,1,2; Y = 0,1,2,3,4 |
| D1 + D2 | $M4^{3+}M4^{4+}(BH_4)_{(3-x)+(4-y)}(AlH_4)_{x+y}$ | X = 0,1,2,3; Y = 0,1,2,3,4 |
| A + D3 | $M1^{1+}M4^{2+}(BH_4)_{(1-x)+(2-y)}(AlH_4)_{x+y}$ | X = 0,1; Y = 0,1,2 |
| B + D3 | $M2^{2+}M4^{2+}(BH_4)_{(2-x)+(2-y)}(AlH_4)_{x+y}$ | X = 0,1,2; Y = 0,1,2 |
| C + D3 | $M3^{3+}M4^{2+}(BH_4)_{(3-x)+(2-y)}(AlH_4)_{x+y}$ | X = 0,1,2; Y = 0,1,2 |
| D1 + D3 | $M4^{3+}M4^{2+}(BH_4)_{(3-x)+(2-y)}(AlH_4)_{x+y}$ | X = 0,1,2,3; Y = 0,1,2 |
| D2 + D3 | $M4^{4+}M4^{2+}(BH_4)_{(4-x)+(2-y)}(AlH_4)_{x+y}$ | X = 0,1,2,3,4; Y = 0,1,2 |

FIG. 3B

| Group A | Group B | Mixed Metal Borohydride Ate Compounds |
|---|---|---|
| $LiBH_4$ | $Mg(BH_4)_2$ | $Li(Na)(K)Mg(BH_4)_3$ |
| $NaBH_4$ | $Al(BH_4)_3$ | $Li(Na)(K)Al(BH_4)_4$ |
| $KBH_4$ | $Mn(BH_4)_2$ | $Li(Na)(K)Mn(BH_4)_3$ |
| | $Zn(BH_4)_2$ | $Li(Na)(K)Zn(BH_4)_3$ |
| | $Zr(BH_4)_2$ | $Li(Na)(K)Zr(BH_4)_3$ |
| | $Ti(BH_4)_3$ | $Li(Na)(K)Ti(BH_4)_4$ |
| | $Sc(BH_4)_3$ | $Li(Na)(K)Sc(BH_4)_4$ |

FIG. 4

| | Mixed Metal Borohydrides | MWt | Wt% $H_2$ (theo.) | Mol $H_2$ Released | Specific Energy Wh/kg | Cation Electro-negativity |
|---|---|---|---|---|---|---|
| | Ideal Fuel | | ≥12.6% | | fuel system≥900 | 1.2-1.6 |
| 1 | $LiMg(BH_4)_3$ | 75.775 | 15.8% | 4.5 | 3988.4 | 1.15 |
| 2 | $NaMg(BH_4)_3$ | 91.824 | 13.1% | 4.5 | 3291.3 | 1.12 |
| 3 | $KMg(BH_4)_3$ | 107.932 | 11.1% | 4.5 | 2800.1 | 1.07 |
| 4 | $Li_2Mg(BH_4)_4$ | 97.559 | 16.4% | 6.0 | 4130.5 | 1.09 |
| 5 | $Li_3Mg(BH_4)_5$ | 119.343 | 16.8% | 7.5 | 4220.7 | 1.06 |
| 6 | $LiMg_2(BH_4)_5$ | 129.763 | 15.4% | 7.5 | 3881.7 | 1.20 |
| 7 | $LiMg_3(BH_4)_7$ | 183.753 | 15.2% | 10.5 | 3837.7 | 1.23 |
| 8 | $Li_2NaMg(BH_4)_5$ | 135.392 | 14.8% | 7.5 | 3720.4 | 1.05 |
| 9 | $LiNa_2Mg(BH_4)_5$ | 151.441 | 13.2% | 7.5 | 3326.1 | 1.04 |
| 10 | $Na_3Mg(BH_4)_5$ | 167.490 | 11.9% | 7.5 | 3007.4 | 1.03 |
| 11 | $LiAl(BH_4)_4$ | 93.295 | 17.1% | 6.0 | 4319.3 | 1.30 |
| 12 | $NaAl(BH_4)_4$ | 109.344 | 14.6% | 6.0 | 3685.3 | 1.27 |
| 13 | $KAl(BH_4)_4$ | 125.452 | 12.8% | 6.0 | 3212.1 | 1.22 |
| 14 | $Li_3Al(BH_4)_6$ | 136.863 | 17.5% | 9.0 | 4416.4 | 1.14 |
| 15 | $Li_2NaAl(BH_4)_6$ | 152.912 | 15.7% | 9.0 | 3952.9 | 1.13 |
| 16 | $LiNa_2Al(BH_4)_6$ | 168.961 | 14.2% | 9.0 | 3577.4 | 1.11 |
| 17 | $Na_3Al(BH_4)_6$ | 185.010 | 13.0% | 9.0 | 3267.1 | 1.10 |
| 18 | $Li_4Al_3(BH_4)_{13}$ | 301.669 | 17.2% | 19.5 | 4341.3 | 1.25 |
| 19 | $MgAl(BH_4)_5$ | 125.506 | 15.9% | 7.5 | 4013.4 | 1.46 |
| 20 | $CaAl(BH_4)_5$ | 141.279 | 14.2% | 7.5 | 3565.3 | 1.31 |
| 21 | $LiMgAl(BH_4)_6$ | 147.290 | 16.3% | 9.0 | 4103.8 | 1.30 |
| 22 | $LiTi(BH_4)_4$ | 114.193 | 14.0% | 6.0 | 3528.8 | 1.26 |
| 23 | $NaTi(BH_4)_4$ | 130.242 | 12.3% | 6.0 | 3094.0 | 1.24 |
| 24 | $Li_2Ti(BH_4)_5$ | 135.977 | 14.7% | 7.5 | 3704.3 | 1.17 |
| 25 | $Li_3Ti(BH_4)_6$ | 157.761 | 15.2% | 9.0 | 3831.4 | 1.12 |
| 26 | $Na_3Ti(BH_4)_6$ | 205.908 | 11.7% | 9.0 | 2935.5 | 1.08 |
| 27 | $MgTi(BH_4)_5$ | 146.400 | 13.7% | 7.5 | 3440.6 | 1.43 |
| 28 | $Mg_4Ti(BH_4)_{11}$ | 308.373 | 14.3% | 16.5 | 3593.5 | 1.36 |
| 29 | $Li_2NaTi(BH_4)_6$ | 173.794 | 13.8% | | | |
| 30 | $LiCa(BH_4)_3$ | 91.548 | 13.1% | 4.5 | 3301.3 | 0.99 |
| 31 | $Li_2Ca(BH_4)_4$ | 113.332 | 14.1% | 6.0 | 3555.6 | 0.99 |
| 32 | $Li_3Ca(BH_4)_5$ | 135.116 | 14.8% | 7.5 | 3728.0 | 0.99 |
| 33 | $LiCa_2(BH_4)_5$ | 161.312 | 12.4% | 7.5 | 3122.6 | 0.99 |
| 34 | $LiNaCa(BH_4)_4$ | 129.379 | 12.4% | | | |
| 35 | $Li_2NaCa(BH_4)_5$ | 151.162 | 13.2% | | | |

FIG. 5

| Metal Cations of Mixed Metal Bororhydride | Compositional Range of Metal Cations (At.%) | Onset Temperature (deg. C) | Peak Temperature (deg. C) | Gravimetric Capacity (Wt% $H_2$) |
|---|---|---|---|---|
| Li – Ca | Li: 42 to 58<br>Ca: 58 to 42 | 180 | 200 to 220 | 3.59 to 7.26 |
| Li – Ti | Li: 57 to 67<br>Ti: 33 to 43 | 200 | 240 to 260 | 10.40 to 11.70 |
| Li – Na – Ti | Li: 50<br>Na: 25<br>Ti: 25 | 210 | 260 | 12.83 |
| Li – Na – Ca – Ti | Li: 31.7<br>Na: 31.7<br>Ca: 31.7<br>Ti: < 5 | 180 | 240 | 10.5 |
| Li – Na – Ca – Ti | Li: 47.6<br>Na: 23.7<br>Ca: 23.7<br>Ti: < 5 | 180 | 240 | 8.83 |
| Metal Borohydride Precursors | Compositional Range of Metal Cations (At.%) | Onset Temperature (deg. C) | Peak Temperature (deg. C) | Gravimetric Capacity (Wt% $H_2$) |
| $LiBH_4$ | 100 | 280 | 310 to 360 | 7.93 |
| $Ca(BH_4)_2$ | 100 | 230 | 320 | 13.00 |
| $NaBH_4$ | 100 | 240 | 360 | 1.17 |
| $Ti(BH_4)_3$ | 100 | 190 | 280 | 9.49 |

FIG. 6

MIXED METAL BOROHYDRIDES

This patent application is a Continuation of International Patent Application PCT/US2013/054478, filed Aug. 12, 2013; U.S. Provisional Patent Application 61/717,172, filed Oct. 23, 2012, U.S. Provisional Patent Application 61/782,443, filed Mar. 14, 2013; and U.S. Provisional Patent Application 61/692,390, filed Aug. 23, 2012, the contents of which are incorporated by this reference, as if fully set forth herein, in their entirety.

TECHNICAL FIELD

This invention relates to solution synthesis of mixed metal borohydrides. These compounds can be used to store and release hydrogen for many different applications, including fuel cells.

BACKGROUND

The demand for energy storage systems that are compact, lightweight, safe and powerful is skyrocketing with the worldwide proliferation of portable electronic devices, including notebook and tablet computers, PDAs, camcorders, digital cameras, mobile phones and increase electronics usage by the military.

Batteries provide a limited amount of energy and have shown slow improvement. Although Moore's Law has computing capability doubling in capacity every two-three years or so, increases in battery capacity have not kept pace. As a result, a "Power Gap" exists between energy demand and the energy available in today's rechargeable batteries. With current battery technology at risk of not keeping pace with product evolution and new technology adoption, military decision makers and consumer electronic manufacturers are turning to alternative energy sources to address the Power Gap, and provide clean renewable power sources which enable "always on" capability at significantly reduced weight. Fuel cells are one of the most promising technologies that can bridge the Power Gap and provide portable products with a significant increase in runtime and greater convenience of use.

One type of fuel cell is proton exchange membrane (PEM) fuel cells; their distinguishing features include lower temperature/pressure ranges (50 to 100° C.) and a special polymer electrolyte membrane. The fuel in a PEM fuel cell is typically hydrogen; in order to utilize hydrogen for a consumer electronic device fuel cell, it needs to be delivered or supplied as part of a solid material that can store it.

The key limiting factor in the widespread adoption of PEM fuel cell based power systems is hydrogen fuel storage. Realization of a viable hydrogen storage solution will have a profound impact on how military and civilian consumers will power portable devices, since batteries simply cannot match demands for runtime, energy density and reliability. A viable hydrogen storage system will enable direct hydrogen fuel cell based power systems, which are considered to be the best alternative to compete with lithium ion battery technologies, for portable applications.

In order to be competitive with lithium ion battery technology, a hydrogen storage cartridge must achieve volumetric energy densities on the order of 1200 Wh/L. The amount of fuel required in the hydrogen storage cartridge such that 1200 Wh/L are provided depends on the fuel material density and gravimetric hydrogen density. Because hydrogen has poor energy content per volume (0.01 kJ/L at standard temperature and pressure (STP) and 8.4 MJ/L for liquid hydrogen vs. 32 MJ/L for petroleum), physical transport and storage as a gas or liquid is impractical. Additionally, the compression process to achieve the pressures necessary to reach a high density is energy-intensive and doesn't solve the hazard issue. Also, the densities of compressed $H_2$ are still below those required to reach practical fuel storage goals.

Physical means to store hydrogen include complex hydrides such as metal alanates, amides, and borohydrides. Complex hydrides are salts consisting of a metal cation and an anion containing hydride such as tetrahydroborate $[BH_4]^-$ and tetrahydroaluminate $[AlH_4]^-$. The hydrogen in complex hydrides can be released hydrolytically, which is essentially an irreversible process, and by heating or reduction of vessel pressure, which are reversible processes if a pressure increase or temperature decrease also leads to readsorption of hydrogen. For hydrogen storage, Group 1 and 2 salts of alanates $[AlH_4]^-$, amides $[NH_2]^-$ and borohydrides $[BH_4]^-$ have been studied extensively and have high hydrogen gravimetric densities (Jain, et. al., *J. Alloys & Compounds* 2010, 03, 303-339; Orimo, et. al., ("Orimo") *Chem. Rev.* 2007, 107, 4111-4132; Schüth, F. *Eur. Phys. J. Special Topics* 2009 176, 155-166; Eberle, et. al., *Angew. Chem. Int. Ed.* 2009, 48, 6608-6630.). However, high thermal stabilities and kinetics barriers to dehydrogenation and/or rehydrogenation in the solid state have thus far prevented complex hydrides from becoming practical hydrogen storage solutions.

Several methods have been investigated in an attempt to improve the thermodynamic properties of complex hydrides, such as formation of nanocomposites and through nanocatalysis (Orimo; Chen, et. al., *Materials Today* 2008, 11(12), 36-43.). The composite of lithium borohydride with magnesium hydride showed reduced enthalpy of decomposition from −67 to −42 kJ mol$^{-1}$ with reversibility (Newhouse, et. al., *J. Phys. Chem.* C 2010, 114, 5224-5232; Vajo, Jet. al., *J. Phys. Chem.* B 2005, 109, 3719-3722.; Bösenberg, et. al., *Acta Mater.* 2007, 55, 39513958.). Another approach, doping or catalyzing a complex hydride with another material, was demonstrated using sodium alanate ($NaAlH_4$) and select titanium compounds. Doped sodium alanate was shown to release hydrogen reversibly at temperatures as low as 100° C. Complex hydrides are an emerging and promising field of research for hydrogen storage. However, thermodynamics and kinetics remain challenging issues.

A recent approach for thermodynamic tuning is the investigation of alkali and alkaline earth metal mixed cation alanates and borohydrides (Graetz, J. *Chem. Soc. Rev.* 2009, 38, 73-82.). These types of compounds could include new compositions (inorganic ate complexes), reactive hydride composites (i.e., react during heating in the solid state and release hydrogen at temperatures below that of the constituent borohydrides), or react on heating as a simple mixture of constituent borohydrides (in other words, not be useful for the production of hydrogen gas). Mixed metal borohydride materials have been studied by many research groups in the past five to ten years.

The synthetic methods used to prepare these materials can be divided into three groups: solution synthesis, solid-state mechanochemical synthesis such as ball-milling, and high temperature/pressure synthesis (Hagemann, H.; Černy, R. *Dalton Trans.* 2010, 39, 6006-6012.). The most prevalent method currently being used for the synthesis of the reported mixed metal borohydride ate complexes is ball-milling. However, a problem with mechanochemical synthesis, particularly for the synthesis of highly reactive materials, is the difficulty preparing pure, halogen-free samples of the expected products. Purification after mechanochemical synthesis is labor-intensive and can be difficult. High temperature/pressure synthesis is neither convenient nor scalable in a practical sense, since material impurities can have a profound impact on dehydrogenation temperature and material stability.

The objectives of the present invention include providing new mixed metal borohydride complexes that are suitable for solid hydrogen storage at practical operating conditions. The complexes are preferably stable under ambient conditions, including ambient air and temperature conditions. The objectives include complexes that can release hydrogen within a temperature range of 100° C. to 400° C. and more preferably within a range of 100° C. to 250° C. The objectives also include having a hydrogen storage material that has shelf stability. The objectives also include creating complexes with lower reaction temperatures and/or greater hydrogen storage capacities than any of the parent compounds.

According to another objective of the invention, there is provided a hydrogen generating apparatus that can be in any number of different embodiments. For example, the hydrogen generating apparatus can include a housing; a pellet strip including a flexible carrier and a plurality of pellets disposed on the carrier, each pellet including a mixed metal borohydride that will release hydrogen gas when heated; an ignition system comprising a heater; and a feed system configured to feed the pellet strip to sequentially position one or more pellets in proximity to the heater such that the heater is capable of heating the proximal pellet to release hydrogen gas. Embodiments can include one or more of the following features:

- the pellet strip is wound on a reel disposed within the housing;
- the hydrogen generator includes a plurality of pellet strips; the plurality of pellet strips can be disposed on a single reel, or at least one pellet strip can be disposed on each of a plurality of reels;
- the pellet strip is in a folded configuration, preferably in a Z-fold pattern;
- the pellets disposed on one section of the carrier are nested between the pellets disposed on another section of the carrier;
- the hydrogen generator includes a plurality of pellet strips;
- the carrier is in the form of a strip with surfaces on opposite sides thereof; the pellets can be disposed on one of the surfaces of the carrier, or the pellets can be disposed on both surfaces of the carrier; the pellets can be disposed in a linear array along the carrier; the pellets can be disposed in a plurality of linear arrays along the carrier;
- the pellet strip is disposed in a storage compartment within the housing;
- the hydrogen generator comprises a plurality of storage compartments within the housing, each configured to contain at least one pellet strip; each compartment can have a feed system configured to feed the at least one pellet strip therein;
- the storage compartment is defined by a moveable wall; the moveable wall can be moveable to reduce the size of the storage compartment as the carrier and pellets are fed by the feed system; the moveable wall can separate the storage compartment from a waste compartment within the housing; a portion of the feed system can be moveable together with the moveable wall;
- the feed system includes a sprocket that cooperates with the pellets disposed on the carrier; the sprocket can be an indexing sprocket; the feed system can include a ratchet configured to allow the carrier to be advanced in only one direction; the feed system can include a bellows that engages an escapement to rotate the sprocket;
- the ignition system includes more than one heater;
- the pellet strip is contained in a user-replaceable container;
- each pellet includes at least one mixed metal borohydride; and
- the pellet includes an ignition material.

In another objective of the invention, there is provided another embodiment of a hydrogen generator. The hydrogen generator includes a sealable housing having an openable member and a hydrogen outlet; a plurality of fuel units removably disposed within the housing, each fuel unit including a casing containing a stack of pellets, and each pellet containing at least one mixed metal borohydride capable of producing hydrogen gas when heated; and a heating system for selectively heating one or more pellets to produce hydrogen gas. The heating system includes a plurality of heating elements disposed on an inside surface of the housing, each heating element in contact with a portion of the fuel unit casing that is in contact with one or more of the pellets contained therein. Heat selectively produced by one of the heating elements can be conducted through the corresponding portion of the fuel unit casing to heat one or more of the pellets. Embodiments can include one or more of the following features:

- the heating system can further include a plurality of heat concentrators, each heat concentrator in contact with and configured to conduct heat to, a portion of a pellet; the heat concentrators can be disposed on external surfaces of the pellets; the heat concentrators can be at least partially disposed within the pellets; a single heat concentrator can be in contact with a single pellet; a single heat concentrator can be in contact with more than one pellet; more than one heat concentrator can be in contact with a single pellet;
- the fuel unit includes thermal insulation between adjacent pellets;
- each fuel unit casing includes a metal such as aluminum or stainless steel;
- each fuel unit includes a hydrogen exit; the hydrogen generator can include one or more hydrogen flow paths from the hydrogen exits to the hydrogen outlet; one or more filters can be disposed within a portion of the one or more hydrogen flow paths;
- the housing includes thermal insulation; and
- the hydrogen generator includes at least a portion of a control system for controlling the selective heating of the pellets; the control system can be configured to monitor at least one of temperature and pressure and selectively heat one or more pellets based at least in part on at least one of the temperature and pressure.

In another objective of the invention, there is provided another embodiment of a hydrogen generator, the hydrogen generator including a cartridge, a compartment configured to removably contain the cartridge, and an ignition system. The cartridge includes a sealed casing with a side wall, a base wall, and a lid; a plurality of pellets, each comprising at least one mixed metal borohydride capable of producing hydrogen gas when heated; a heat concentrator in direct contact with the casing and capable of conducting heat from the casing to the at least one reactant; a hydrogen outlet valve in the casing; and a hydrogen flow path from each fuel pellet to the hydrogen outlet valve. The compartment includes a housing with a side wall and a lid; a hydrogen outlet through the housing; a cavity within the housing within which the cartridge can be disposed; and a plurality of heating elements disposed on an inside surface of the housing, such that each heating element is in contact with an outer surface of the cartridge casing and aligned with a heat concentrator when the cartridge is disposed within the cavity. The ignition system includes the heat concentrators, the heating elements, and circuitry for conducting an electric current to the heating elements, such that the electrical current can be applied selectively to one or more heating elements for generating heat to selectively heat one or more pellets to initiate a reaction to produce hydrogen gas. Embodiments can include one or more of the following features:

the cartridge has a cylindrical shape;

the cartridge has a prismatic shape;

the cartridge and the compartment cooperate such that the cartridge can be inserted into the compartment only such that the heating elements and the heat concentrators are properly aligned;

the pellets are arranged in multiple layers, each layer having a single pellet;

the pellets are arranged in multiple layers, each layer containing more than one pellet;

the pellets are arranged in a single layer;

the heat concentrators are disposed on pellet surfaces;

the heat concentrators are partially disposed within the pellets;

each heat concentrator has a cartridge casing contact portion that extends beyond the pellet;

each heat concentrator comprise aluminum;

each heat concentrator comprises a layer of pyrolictic carbon in contact with the pellet;

the heat concentrators are in pressure contact with the inside surface of the casing;

a thermally insulating material is disposed between at least portions of adjacent pellets; a layer of the insulating material can separate layers of the pellets; pellet surfaces can be coated with a layer of the insulating material;

the portion of the cartridge casing that makes contact with the heating element comprises stainless steel or aluminum;

the housing comprises a material with low electrical and thermal conductivity;

the heating elements are disposed on an inside surface of at least one of the side wall, the lid and the door of the housing;

the heating elements make pressure contact with the outer surface of the cartridge casing when the cartridge is disposed within the compartment;

the cartridge can include means for maintaining contact between the heat concentrators and the solid compositions and/or maintaining alignment between the heat concentrators and the heating elements as the heat generator is being used;

the hydrogen flow path comprises a channel extending through all layers of pellets; the hydrogen flow path can include a central channel; the hydrogen flow path can comprise more than one channel;

at least one filter is disposed in the hydrogen flow path;

the cartridge comprises a foil seal over the hydrogen outlet valve prior to insertion of the cartridge into the compartment; the foil seal can be broken upon insertion of the cartridge into the compartment; and the pellets further comprise an ignition material, preferably at least one material selected from the group of iron powder plus $KClO_4$, $TiH_2$ plus $KClO_4$, $MnO_2$ plus $LiAlH_4$, Ni plus Al, Zr plus $PbCrO_4$, $Fe_2O_3$ plus Al, and $LiAlH_4$ plus $NH_4Cl$.

In another objective of the invention, there is provided another embodiment of a hydrogen generator including a cartridge including a sealed casing and a plurality of pellets stacked within the casing, each pellet containing at least one mixed metal borohydride capable of producing hydrogen gas when heated; a compartment including a housing, a hydrogen outlet through the housing, and a cavity within the housing within which the cartridge can be removably disposed; and an induction heating system. The induction heating system includes a plurality of secondary coils within the cartridge casing, with each secondary coil in contact with one or more of the pellets. The induction heating system also includes at least one primary coil within the compartment housing. The induction heating system is configured to receive an electric current from a power source, provide an electromagnetic field from a flow of the current in the at least one primary coil, induce an electric current in the at least one secondary coil, and provide heat from a flow of the induced electric current; thereby heating the pellets. Embodiments can include one or more of the following features:

the cartridge has a cylindrical shape;

the cartridge has a prismatic shape;

the pellets are arranged in multiple layers, each layer having a single pellet;

each pellet is in contact with a secondary coil; each pellet can be in contact with a separate secondary coil; more than one pellet can be in contact with the same secondary coil;

the at least one secondary coil is in contact with a pellet surface;

the at least one secondary coil is disposed at least partially within a pellet;

the induction heating system includes a moveable primary coil;

the induction heating system includes a plurality of primary coils; the primary coils can be adjacent to, on or at least partially recessed in an inner surface of the compartment housing;

a thermally insulating material is disposed between adjacent pellets;

the cartridge can include means for maintaining contact between the solid compositions and the secondary coils;

the cartridge can include means for maintaining alignment between the secondary coils and the primary coils as the heat generator is being used;

the hydrogen flow path comprises a channel extending through and/or around the pellets; the hydrogen flow path can include a central channel; the hydrogen flow path can comprise more than one channel;

at least one filter is disposed in the hydrogen flow path;

the cartridge comprises a foil seal over the hydrogen outlet valve prior to insertion of the cartridge into the compartment; the foil seal can be broken upon insertion of the cartridge into the compartment; and the pellets further comprise an ignition material, preferably at least one material selected from the group of iron powder plus $KClO_4$, $TiH_2$ plus $KClO_4$, $MnO_2$ plus $LiAlH_4$, Ni plus Al, Zr plus $PbCrO_4$, $Fe_2O_3$ plus Al, and $LiAlH_4$ plus $NH_4Cl$.

In yet another objective of the invention, there is provided a fuel cell system including a fuel cell with an anode, a cathode, and an electrolyte that that is used with any of the hydrogen generators as described herein. Hydrogen gas from a hydrogen generator is supplied to the anode of the fuel cell. Embodiments can include one or more of the following features:

the fuel cell cathode is supplied with oxygen.

the fuel cell electrolyte separates the anode and the cathode.

the fuel cell system further includes a control system configured to control an ignition system and a feed system based on at least one of a pressure within the fuel cell system, an electrical characteristic of the fuel cell system, or an electrical characteristic of an electronic device in electrical communication with the fuel cell system; the control system can include at least one of a microprocessor, a micro controller; digital circuitry, analog circuitry, hybrid digital and analog circuitry; a switching device; a capacitor, and sensing instrumentation.

the fuel cells are "stacked," or placed in series or parallel circuits, to increase the voltage and current output to meet an application's power generation requirements.

the fuel cell system includes a control system for controlling the selective heating of the pellets; a portion of the control system can be disposed within the hydrogen generator; a portion of the control system can be disposed outside the hydrogen generator.

the ignition system is configured to monitor at least one of temperature and pressure and selectively heat one or more pellets to provide hydrogen as needed by the fuel cell stack.

a portion of the ignition system is in the fuel cell system outside the hydrogen generator.

These and other advantages of the invention will be further understood and appreciated by those skilled in the art by reference to the following written specification, claims, and appended drawings.

SUMMARY

According to an aspect of the invention, a method of producing a mixed metal borohydride is provided. The method includes preparing a first precursor solution consisting essentially of a homometallic borohydride compound and a solvent, the homometallic borohydride being lithium borohydride; preparing a second precursor solution consisting essentially of a borohydride compound containing one or more metal cations selected from the group of metals consisting of sodium, magnesium, calcium and titanium; combining the first and second precursor solutions to create a mixture; forming the mixed metal borohydride in the mixture; and removing the solvent from the mixture containing the mixed metal borohydride to produce a solid mixed metal borohydride. Embodiments of the invention can include one or a combination of the following:

the solvent used in the first and second precursor solutions is the same;

the solvent is diethyl ether;

a third precursor solution is prepared consisting essentially of a third borohydride compound, different from the borohydride compound in the second precursor solution and containing one or more metal cations selected from the group of metals consisting of sodium, magnesium, calcium and titanium, and wherein the third precursor solution is combined with the first and second precursor solutions to create the mixture;

the second precursor solution consists essentially of one or more of sodium borohydride, magnesium borohydride, calcium borohydride and titanium borohydride;

the second precursor solution consists essentially of calcium borohydride;

the second precursor solution consists essentially of titanium borohydride; the solid mixed metal borohydride can be $Li_3Ti(BH_4)_2$;

the second precursor solution consists essentially of sodium borohydride and titanium borohydride; the solid mixed metal borohydride can contain less than 5 atomic weight percent of titanium;

the second precursor solution consists essentially of sodium borohydride, calcium borohydride and titanium borohydride; the solid mixed metal borohydride can contain less than 5 atomic weight percent of titanium;

the second precursor solution consists essentially of magnesium borohydride; the solid mixed metal borohydride can be $Li_2Mg(BH_4)_2$; the solid mixed metal borohydride can be $Li_3Mg(BH_4)_5$;

the solvent is removed from the mixture in vacuo;

the steps of preparing the precursor solutions are done under argon at room temperature;

a majority of the solid mixed metal borohydride comprises nanoparticles; and the solid mixed metal borohydride is coated; the solid mixed metal borohydride can be coated with an inert material.

The disclosure may be better understood by referring to the following figures. The components in the figures are not necessarily to scale, emphasis instead being placed upon illustrating the principles of the invention. In the figures, like reference numerals designate corresponding parts throughout the different views.

BRIEF DESCRIPTION OF THE DRAWING

FIGS. 2A-2B show the gravimetric hydrogen density of the homometallic borohydride compounds.

FIGS. 3A-3B describe the precursor compounds and the mixed metal borohydride compounds in FIGS. 2A-2B by the generic formulas.

FIG. 4 shows by combining a compound from Group A with one from Group B in the appropriate stoichiometry and removal of solvent, a wide variety of mixed metal borohydride complexes or reactive borohydride complexes can be synthesized.

FIG. 5 illustrates examples of mixed metal borohydrides that can be created.

FIG. 6 illustrates compounds produced based mixed metal borohydrides.

Figure 1:
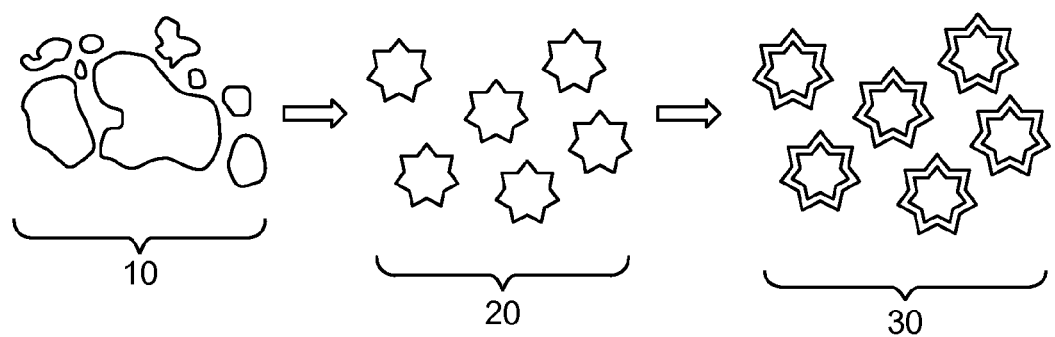
FIG. 1 shows an illustration of the particle size optimization and encapsulation of the mixed metal borohydrides.

All descriptions and callouts in the Figures and all content therein are hereby incorporated by this reference as if fully set forth herein.

DETAILED DESCRIPTION OF THE PREFERRED EMBODIMENTS

The embodiments of the present inventions described below are not intended to be exhaustive or to limit the invention to the precise forms disclosed in the following detailed description. Rather the embodiments are chosen and described so that others skilled in the art may appreciate and understand the principles and practices of the present inventions.

All publications and patents mentioned herein are incorporated herein by reference in their respective entireties for the purpose of describing and disclosing, for example, the constructs and methodologies that are described in the publications which might be used in connection with the presently described invention. The publications discussed above and throughout the text are provided solely for their disclosure prior to the filing date of the present application. Nothing herein is to be construed as an admission that the inventor is not entitled to antedate such disclosure by virtue of prior invention.

It is to be understood that the invention may assume various alternative orientations and step sequences, except where expressly specified to the contrary. It is also to be understood that the specific processes described in the following specification are simply exemplary embodiments of the inventive concepts defined in the appended claims. Hence, specific measurements and other physical characteristics relating to the embodiments disclosed herein are not to be considered as limiting, unless the claims expressly state otherwise.

Unless otherwise specified, the following definitions and methods are used herein:
"mixed metal borohydrides" means a borohydride compound that contains two or more different metals;
"homometallic borohydride" means a borohydride compound containing one metal;
"nanoparticle," as generally used herein refers to particle or a structure in the nanometer (nm) range, typically from about 0.1 nm to about 1000 nm in diameter;
"wt %" means weight percent;
"THF" means tetrahydrofuran;
"TGA" means thermogravimetric analysis; and
"GC/MS" means gas chromatography/mass spectrometry.

Unless otherwise specified herein, all disclosed characteristics, values and ranges are as determined at room temperature (20° C. to 25° C.).

The alkali metal borohydride compounds LiBH4, NaBH4, and KBH4 are commercially available. The borohydrides of the alkaline earth and light transition metals, $Mg(BH_4)_2$, $Al(BH_4)_3$, $Mn(BH_4)_2$, $Zn(BH_4)_2$, $Zr(BH_4)_4$, $Ti(BH_4)_3$, and $Sc(BH_4)_3$ are for the most part known compounds and their solution synthesis has been described. Briefly, these compounds are prepared as follows according to literature reports.

Magnesium Borohydride (Zanella, P.; Crociani, L.; Masiocchi, N.; Biunchi, G. Inorg. Chem. 2007, 46, 9039-9041.); Two methods have been demonstrated for the preparation of magnesium borohydride (Mg (BH$_4$)$_2$), reaction of commercially available Mg(nBu)$_2$ with borane-methyl sulfide in toluene, and isolation of the precipitate, and reaction of a toluene solution of Al(BH$_4$)$_3$ (described below) with Mg(nBu)$_2$, and isolation and purification of the precipitate. Both methods furnish the desired product in high yield.

Aluminum Borohydride (Zanella, P.; Crociani, L.; Masiocchi, N.; Biunchi, G. Inorg. Chem. 2007, 46, 9039-9041.): A toluene solution of aluminum borohydride (Al(BH$_4$)$_3$) was prepared in 78% yield by reaction of purified AlCl3 with lithium borohydride, followed by distillation of the filtrate.

Manganese Borohydride (Makhaev, V. D.; Borisov, A. P.; Gnilomedova, T. P.; Lobkovskii, e. B.; Chekhlov, A. N. Russ. Chem. Bull. 1987, 36(8), 1582-1586.): The THF adduct of manganese borohydride (Mn(BH$_4$)$_2$.3THF) was obtained by reaction of MnCl$_2$ with an excess of sodium borohydride followed by filtration and purification to remove excess sodium borohydride.

Titanium Borohydride (Mirviss, S. B.; Dougherty, H. W.; Looney, R. W. U.S. Pat. No. 3,310,547 Mar. 21, 1967.): A THF solution of titanium borohydride (Ti(BH$_4$)$_3$) was prepared by reaction of titanium tetraisopropoxide with diborane in THF. The titanium was reduced from the +4 to +3 valence state during the reaction. When complexed with two and three molecules of THF the titanium compounds are blue and reddish-violet crystalline solids, respectively.

Scandium Borohydride (Marks, T. J.; Kolb, J. R. Chem. Rev. 1977, 77, 263-293. Morris, J. H.; smith, W. E. J. Chem. Soc., Chem. Commun. 1970, 245.): Treatment of anhydrous scandium (III) chloride with a slight excess of lithium borohydride in THF furnished a volatile white solid of Sc(BH$_4$)$_3$.THF.

Zinc Borohydride (Pelter, A.; Smith, K.; Brown, H. C. "Borane Reagents" 1988, Academic Press, ISBN 0-12-549875-6, p 414.): A THF solution of zinc tetrahydroborate (Zn(BH$_4$)$_2$) was prepared by reaction of two equivalents of sodium borohydride with ZnCl$_2$ in THF in quantitative yield. The supernatant liquid was free of chloride according to a silver nitrate test. The solution could be stored under N$_2$ and used as required.

Zirconium Borohydride (Marks, T. J.; Shimp, L. A. J. Am. Chem. Soc. 1972, 94, 1542-1550. Williams, D. R.; Benbow, J. W.; Sattleberg, T. R.; Ihle, D. C. Tetrahedron Lett. 2001, 42, 8597-8601.): This compound was prepared neat or as an ethereal solution by reaction of zirconium (IV) chloride with either lithium or sodium borohydride.

As described above, once the mixed metal borohydrides are created, the particle size can be optimized and coating protocols can be used to create a stabilizing shell of inert material, as illustrated in the FIG. 1

1. FIGS. 2A-2B shows the gravimetric hydrogen density of the homometallic borohydride compounds on the left and some mixed metal borohydride compounds on the right. By combining a compound from one group with another in the appropriate stoichiometry at an appropriate temperature, a wide variety of mixed metal borohydride complexes can be synthesized.

The equations shown below are examples of the reactions to create mixed metal borohydrides.

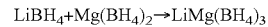

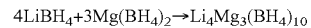

The precursor compounds and the mixed metal borohydride compounds in FIGS. 2A-2B can be described by the generic formulas, such as shown in FIGS. 3A and 3B. The binary (i.e., two metals) complex hydride compositions are derived by the combination of parent compounds from the different groups. However, it should be noted that, as shown in the examples, the mixed metal borohydride compounds can have more than two metals.

For example, FIG. 3A shows groups of homometallic borohydride precursor compounds. Groups A and B can be prepared using solution methods or purchased if commercially available. By combining a compound from Group A with one from Group B in the appropriate stoichiometry and removal of solvent, a wide variety of mixed metal borohydride ate complexes or reactive borohydride complexes can be synthesized, as seen in the list in the block on the right of FIG. 4, where the Na and K cations in parentheses are alternatives to Li. Although illustrated using a 1:1 mole ratio of a compound from Group A with Group B, other mole ratios can be used. The materials can be converted to nanoparticles, or directly prepared as a monodispersion of nanoparticles in the target size range of 5-50 nm. It is believed that particle size can effect the dehydrogenation temperature.

Once nanoparticles of the optimal size are prepared, coating protocols can be used to create a stabilizing shell of inert material. The goal of the stabilization is both chemical, to reduce the flammability of the materials and prevent degradation, and mechanical, to reinforce the material so that any structural changes during dehydrogenation (and potentially, rehydrogenation cycles) are accommodated without loss of reactivity. By keeping the shell layer very thin compared to the size of the core, the impact on gravimetric and volumetric hydrogen density is minimized.

Examples of mixed metal borohydrides that can be created are summarized in FIG. 5. As noted above, having a hydrogen storage compound that can release hydrogen with a 100° to 400° C. range is preferred. Even more preferential is a range of 100° to 250° C. The following compounds are ones that should release hydrogen within the preferred range. As the gravimetric capacity increases, a higher desorption temperature is allowable given the benefit of hydrogen storage and release capacity.

Single experiments were performed for the preparation of $Li_2Mg(BH_4)_4$ and $Li_3Mg(BH_4)_5$ and some characterization was carried out. The $Mg(BH_4)_2$ was prepared using literature methods and blended with a commercial solution of $LiBH_4$ in ether at low temperature. Upon thermolysis $Li_2Mg(BH_4)_2$ began to evolve $H_2$ at 130° C. and delivered 10.5 wt % $H_2$ after heating to 375° C. The $Li_3Mg(BH_4)_5$ sample began to lose $H_2$ at 166° C. and delivered 7.8 wt % $H_2$ after heating to about 370° C. The additional weight loss in the TGA is probably residual solvent, as the GC/MS analysis of the headspace only showed trace amounts of solvents and did not show the presence of diborane/pentaborane. Similarly, an attempt was made to prepare $Li_3Ti(BH_4)_6$ by blending a commercial solution of $LiBH_4$ in ether with $Ti(BH_4)_3$.THF prepared using literature methods (Franz, K.; Fusstetter, H.; Nöth, H. Z. anorg. Allg. Chemie 1976, 427(2), 97-113.). Upon thermolysis the tarry aubergine colored material began to release $H_2$ at 159° C. and delivered 7.3 wt % $H_2$ after heating to 292° C.

For example, thin polyelectrolyte or polymer-inorganic hybrid coatings can be added using layer-by-layer self-assembly techniques, such as described by Dobbins et al. (Material Matters 2007, 2(2) 19) and others (Broderick et al., Chem. Mater. 2012, 24(10), 1786; Borodina et al., ACS Applied Mater. Interfaces 2009, 1(15) 996) for encapsulation of metal hydrides. Alternatively, uncharged polymers can be deposited on metal borohydrides using an interfacial polymer precipitation protocol that is induced by solvent evaporation (Borodina et al., J. Materials Chemistry 2010, 20(8), 1452). Thus, the mixed metal borohydrides can be formed into nanoparticles that can be encapsulated. The goal of the stabilization is both chemical, to reduce potential flammability of the materials and prevent degradation, and mechanical, to reinforce the material so that any structural changes during dehydrogenation are accommodated and volume expansion is minimized. By keeping the shell layer very thin compared to the size of the core, the impact on gravimetric and volumetric hydrogen density is minimized.

EXAMPLES

Example 1

Preparation of $Li_3Mg(BH_4)_5$ $Mg(BH_4)_2$ was prepared from dibutylmagnesium and borane-methyl sulfide complex as described in the literature (Zanella, P.; et al. Inorg. Chem. 2007, 46, 9039-9041). A 0.5 M solution of $Mg(BH_4)_2$ was prepared by dissolving 0.498 g of $Mg(BH_4)_2$ (9.22 mmol) in 10 mL of anhydrous diethyl ether with stirring under Ar at room temperature. A commercial 0.5 M LiBH4 in diethyl ether (55.32 mL, 27.66 mmol) was added to the Mg(B1-14)2 solution using a canula. The resulting mixture was stirred overnight at room temperature. Solvent was removed in vacuo and 1.6 g of white product ($Li_3Mg(BH_4)_5$ complexed with residual solvent) was obtained after drying on a vacuum line overnight at room temperature. Upon thermolysis, the $Li_3Mg(BH_4)_5$ sample began to lose $H_2$ at 166° C. and delivered 7.8 wt % $H_2$ (measured) after heating to about 370° C.

Example 2

Preparation of $Li_2NaMg(BH_4)_5$ $Mg(BH_4)_2$ is prepared from dibutylmagnesium and borane-methyl sulfide complex as described in the literature (Zanella, P.; et al. Inorg. Chem. 2007, 46, 9039-9041). A 0.5 M solution of $Mg(BH_4)_2$ is prepared by dissolving 0.27 g (5.00 mmol) of $Mg(BH_4)_2$ in 10 mL of anhydrous diethyl ether with stirring under Ar at room temperature. A commercial 0.5 M $LiBH_4$ in diethyl ether (20 mL, 10.00 mmol) is combined with a solution of $NaBH_4$ prepared by dissolving 0.19 g of $NaBH_4$ in 10 mL of anhydrous 1,2-dimethoxyethane. The $Mg(BH_4)_2$ solution is added to the $LiBH_4$/$NaBH_4$ solution using a syringe. The resulting mixture is stirred overnight at room temperature. The solvent is removed in vacuo and the resulting product ($Li_2NaMg(BH_4)_5$) is dried on a high vacuum line overnight. This material contains approximately 14.8 wt % $H_2$ (theoretical).

Example 3

Preparation of $Li_4Al_3(BH_4)_{13}$ $Al(BH_4)_3$ (1.42 g, 19.889 mmol) is prepared as described by Zhao, J-C, et al. (J. Phys. Chem. C. 2009, 113, 2) and dissolved in anhydrous diethyl ether as described by Bird and Wallbridge (J. Chem. Soc. 1965, 3923). A commercial 0.5 M $LiBH_4$ in diethyl ether (53 mL, 26.52 mmol) is added to the $Al(BH_4)_3$ solution by syringe at −78° C. The resulting mixture is allowed to warm slowly to room temperature and stirred for three hours under Ar. The solvent is removed in vacuo and the resulting product ($Li_4Al_3(BH_4)_{13}$) is dried on a high vacuum line overnight. This material contains approximately 17.2 wt % $H_2$ (theoretical).

Example 4

Preparation of $Li_3Ti(BH_4)_6$

Titanium borohydride (Ti(BH4)3) was prepared as the THF complex by reacting titanium (IV) isopropoxide (Aldrich, 2.22 mL, 0.008 mol) with borane-tetrahydrofuran (Aldrich, 1 M solution in THF, 33 mL, 0.033 mol) in 10 mL of anhydrous THF at 0° C. with stirring for two hours under argon atmosphere (Mirviss, S. B.; Dougherty, H. W.; Looney, R. W. U.S. Pat. No. 3,310,547 Mar. 21, 1967). Solvent and volatile by-products were removed in vacuo, first at 0° C. and then at room temperature. The deep blue oily product was then dissolved in 10 mL of anhydrous diethyl ether and cooled to 0° C. A solution of LiBH4 in diethyl ether was added (Aldrich, 0.5 M, 48 mL, 0.024 mol) and the mixture was warmed to room temperature with stirring under argon for 2 hours. A sticky aubergine-colored solid (2.1 g, Li3Ti (BH4)6 complexed with residual solvent) was obtained after solvent removal and drying on a vacuum line overnight. Upon thermolysis the product began to release H2 at 159° C. and delivered 7.3 wt % H2 (measured) after heating to 292° C.

Example 5

Preparation of $LiCa(BH_4)_3$

Calcium borohydride bis-tetrahydrofuran (Aldrich, 2.14 g, 10 mmol) is dissolved in 10 mL of anhydrous diethyl ether and cooled to 0° C. with stirring under argon atmosphere. A solution of lithium borohydride (Aldrich, 0.5 M in diethyl ether, 20 mL, 10 mmol) is added and the mixture was allowed to warm to room temperature. After stirring for two hours the solvent is removed in vacuo to produce the mixed metal borohydride $LiCa(BH_4)_3$, 13.1 wt % $H_2$ (theoretical).

Example 6

Preparation of $Li_2NaCa(BH_4)_5$

Calcium borohydride bis-tetrahydrofuran (Aldrich, 2.14 g, 10 mmol) is dissolved in 10 mL of anhydrous diethyl ether and cooled to 0° C. with stirring under argon atmosphere. A solution of lithium borohydride (Aldrich, 0.5 M in diethyl ether, 40 mL, 20 mmol) and sodium borohydride (0.5 M in dimethoxyethyl ether, 20 mL, 10 mmol) is added and the mixture was allowed to warm to room temperature. After stirring for two hours the solvent is removed in vacuo first at room temperature and finally at 60° C. to produce the mixed metal borohydride $Li_2NaCa(BH_4)_5$, 13.2 wt % $H_2$ (theoretical).

Example 7

Preparation of $Li_2NaTi(BH_4)_6$

Titanium borohydride (Ti(BH4)3) is prepared as the THF complex by reacting titanium (IV) isopropoxide (Aldrich, 2.22 mL, 7.5 mmol) with borane-tetrahydrofuran (Aldrich, 1 M solution in THF, 33 mL, 0.033 mol) in 10 mL of anhydrous THF at 0° C. with stirring for two hours under Argon atmosphere (Mirviss, S. B.; Dougherty, H. W.; Looney, R. W. U.S. Pat. No. 3,310,547 Mar. 21, 1967). Solvent and volatile by-products are removed in vacuo, first at 0° C. and then at room temperature. The deep blue oily product is then dissolved in 10 mL of anhydrous diethyl ether and cooled to 0° C. A solution of $LiBH_4$ in diethyl ether is added (Aldrich, 0.5 M, 30 mL, 15 mmol), followed by 15 mL of a 0.5 M solution of sodium borohydride in dimethoxyethyl ether (Aldrich, 7.5 mmol) and the mixture was warmed to room temperature with stirring under argon. After stirring for two hours the solvent is removed in vacuo first at room temperature and finally at 60° C. to produce the mixed metal borohydride $Li_2NaTi(BH_4)_6$, 13.8 wt % $H_2$ (theoretical).

Example 8

Preparation of $LiAl(AlH_4)(BH_4)_3$ $Al(BH_4)_3$ (1.31 g, 18.271 mmol) is prepared as described by Zhao, J-C, et al. (*J. Phys. Chem. C.* 2009, 113, 2) and dissolved in 40 mL of anhydrous diethyl ether as described by Bird and Wallbridge (J. Chem. Soc. 1965, 3923). A commercial solution of 1.0 M $LiAlH_4$ in diethyl ether (18.3 mL, 18.27 mmol) is added to the $Al(BH_4)_3$ solution by syringe at −78° C. The resulting mixture is allowed to warm slowly to room temperature and stirred for three hours under argon. The solvent is removed in vacuo and the resulting product ($LiAl(AlH_4)(BH_4)_3$) is dried on a high vacuum line overnight. This material contains approximately 14.6 wt % $H_2$ (theoretical).

Example 9

Preparation of $LiMgAl(BH_4)_6$ $Al(BH_4)_3$ (0.97 g, 13.579 mmol) is prepared as described by Zhao, J-C, et al. (*J. Phys. Chem. C.* 2009, 113, 2) and dissolved in 27 mL of anhydrous diethyl ether as described by Bird and Wallbridge (J. Chem. Soc. 1965, 3923). $Mg(BH_4)_2$ is prepared from dibutylmagnesium and borane-methyl sulfide complex as described in the literature (Zanella, P.; et al. *Inorg. Chem.* 2007, 46, 9039-9041). A 0.5 M solution of $Mg(BH_4)_2$ is prepared by dissolving 0.733 g (13.579 mmol) of $Mg(BH_4)_2$ in 13.6 mL of anhydrous diethyl ether with stirring under Ar at room temperature. The $Al(BH_4)_3$ and $Mg(BH_4)_2$ solutions are combined at −78° C. with stirring under argon by canula transfer of the $Mg(BH_4)_2$ solution into the $Al(BH_4)_3$ solution. A commercial solution of 0.5 M $LiBH_4$ in diethyl ether (27.2 mL, 27.16 mmol) is added to the $Al(BH_4)_3/Mg(BH_4)_2$ solution by syringe at −78° C. The resulting mixture is allowed to warm slowly to room temperature and stirred for six hours under Ar. The solvent is removed in vacuo and the resulting product ($LiMgAl(BH_4)_6$) is dried on a high vacuum line overnight. This material contains approximately 16.3 wt % $H_2$ (theoretical).

Example 10

Preparation of $Li_2Mg(BH_4)_4$ $Mg(BH_4)_2$ was prepared from dibutylmagnesium and borane-methyl sulfide complex as described in the literature (Zanella, P.; et al. *Inorg. Chem.* 2007, 46, 9039-9041). A 0.5 M solution of $Mg(BH_4)_2$ was prepared by dissolving 0.498 g of $Mg(BH_4)_2$ (9.22 mmol) in 10 mLs of anhydrous diethyl ether with stirring under Ar at room temperature. A commercial 0.5 M $LiBH_4$ in diethyl ether (36.86 mL, 18.43 mmol) was added to the $Mg(BH_4)_2$ solution using a canula. The resulting mixture was stirred overnight at room temperature. Solvent was removed in vacuo and 1.23 g of white product ($Li_2Mg(BH_4)_4$ complexed with residual solvent) was obtained after drying on a vacuum line overnight at room temperature. Upon thermolysis $Li_2Mg(BH_4)_2$ began to evolve $H_2$ at 130° C. and delivered 10.5 wt % $H_2$ (measured) after heating to 375° C.

Example 11

Preparation of Lithium Based Mixed Metal Borohydrides

The synthesis of many mixed metal borohydrides was performed using solutions of precursor compounds in an inert atmosphere at room temperature. Solutions of known concentrations of precursor compounds were prepared. Precursor solutions were mixed in desired stoichiometeries and deposited on hot plate array substrates using an automated liquid dispenser to produce libraries of the desired mixed metal borohydrides. Each hot plate substrate was a silicon microfabricated device, similar to those described by Guerin et al. (J. Comb. Chem. 2008, 10, 37-43), Amieiro-Fonesca et al. (Faraday Discuss. 2011, 151, 369-384), Anghel et al. (International Patent Publication No. WO 2009/101046 A1) and Guerin et al. (International Patent Publication No. WO 2005/035820 A 1). The precursors used were $NaBH_4$, $LiBH_4$, $Mg(BH_4)_2$, $Ca(BH_4)_2 \cdot 2THF$ and $Ti(BH_4)_3$ in appropriate solvents (one or a combination of dimethylformamide (DMF), tetrahydrofuran (THF) and toluene). Arrays of the synthesized borohydrides were transferred to an ultra-high vacuum (UHV) chamber and degassed at approximately $3 \times 10^{-9}$ Torr) for approximately 10 hours. While in the UHV chamber, each of the synthesized borohydrides was tested using Temperature Programmed Desorption, heating each of the microhotplates sequentially, while monitoring the temperature and measuring the hydrogen partial pressure using a mass spectrometer.

The compounds produced included the lithium based mixed metal borohydrides identified in FIG. 6. These mixed metal borohydrides did not react upon exposure to air and would release hydrogen gas within the 100° C. to 260° C. temperature range. As a comparison, the metal borohydride precursors used are shown in the lower portion of FIG. 6. Approximate onset and peak temperatures and gravimetric hydrogen capacities are shown. In general, the onset and peak temperatures for the mixed metal borohydrides in FIG. 6 were lower than those for the precursor compounds, and in most cases the gravimetric capacities were greater than the combined gravimetric capacities of the precursor compounds.

Another inventive aspect is a hydrogen generator and a fuel cell system that uses the mixed metal borohydrides. The hydrogen generator is a hydrogen gas generating apparatus that produces hydrogen gas that is consumed by the fuel cell to produce electricity for an electronic device. The hydrogen generator includes a housing, a mixed metal borohydride as the reactant that will release hydrogen gas when heated, an ignition system including a heater to heat the reactant, and optionally a feed system. The reactant is contained in a solid composition that can be segregated into individual quantities of the composition. Quantities of the composition are referred to herein as pellets. As used herein, "pellet" means a mass of a solid composition that includes a reactant whose reaction is initiated by heating. The optional feed system is configured so individual pellets or groups of pellets are sequentially positioned in proximity to the heater, which can heat the pellets to initiate their thermal decomposition and evolve hydrogen gas. Alternatively, the ignition system can include a plurality of heaters for heating a plurality of stationary pellets.

The pellets can be of any suitable size and shape. They can be sized and shaped to fit into the housing in a volume-efficient manner. For example, the pellets can be in the shape of round, oval or prismatic (e.g., trapezoidal, rectangular or square) pills, tablets, wafers, cakes or volumes of powder or granules. The pellet size and composition can be chosen to provide a desired quantity of hydrogen from each pellet, based on the size of the fuel cell stack and the power requirements of the electronic device, for example. The pellets can be formed in various ways. For example, they can be fed, poured, deposited (e.g., by coating, printing or otherwise applying), or formed (e.g., by molding or shaping) and secured (e.g., by adhering, fastening or the like) onto one or both surfaces of a carrier (e.g., in the form of a strip, ribbon, belt, sheet, string or the like). As used herein, "strip" is intended to include any such carrier configuration.

The pellets contain at least one mixed metal borohydride reactant that releases hydrogen as the reactant decomposes by heating or otherwise. More than one reactant can be included.

The pellets can also contain one or more additives. Examples of additives include binders (e.g., acrylates and styrene block copolymers), stabilizing compounds (e.g., solid bases), reaction accelerators (e.g., solid acids), catalysts as described above, ignition materials as described below, thermally conductive materials (e.g., metals, graphites and combinations and composites thereof), and so on.

A pellet carrier strip should be sufficiently flexible to be fed by the feed system. The carrier including the pellets (i.e., the pellet strip) can be loaded into the housing in a rolled, folded or other configuration. In one embodiment a pellet strip is wound on a reel. More than one pellet strip can be disposed on a single reel, or one or more pellet strips can be disposed on separate reels. In another embodiment a pellet strip is folded in a Z-fold pattern (i.e., with alternating folds in opposite directions to create a stack of multiple layers of the pellet strip). The pellet strip can be disposed in a storage compartment within the housing, or the pellet strip can be disposed in a separate container that can be loaded into or attached to the housing. The hydrogen generator can be configured to contain one or more pellet strips, such as with at least one pellet strip in each of a plurality of compartments or containers, each of which can have a separate feed system. Pellets can be disposed on the carrier and the pellet strip can be disposed is such a manner as to facilitate feeding and provide a high density of pellets within the hydrogen generator. For example, the pellets can be disposed in one or more linear arrays along the carrier, or the pellet strip can be arranged so that pellets on one section of the carrier are nested between pellets on another section of the carrier.

To prevent the transfer of heat from one pellet to adjacent pellets on the carrier, which could result in an uncontrolled initiation of the reaction of adjacent pellets, the carrier can be a material that is not a good conductor of heat. The carrier can be made from a material that does not react substantially during the thermal decomposition of the hydrogen containing reactant. This has the advantage of not generating any reaction products that might interfere with the functioning of the hydrogen generator or that would have to be removed from the hydrogen gas before being used by the fuel cell stack. Alternatively, the carrier can be made from a material that does react during the thermal decomposition of the hydrogen containing reactant, e.g., by burning. This can eliminate the need to collect and store the carrier after the pellets have been consumed. Examples of materials that can be suitable as carrier materials include polyimides such as KAPTONO from E.I. duPont de Nemours; polypropylene such as SCLAIR® from Nova Chemicals (International) (Switzerland); TEFLON®, TEFZEL®, and MYLAR® from E.I. duPont de Nemours; and paper.

While it may be desirable to react more than one pellet at a time, in order to prevent the uncontrolled initiation of adjacent pellets, it is desirable for individual pellets or groups of pellets to be thermally insulated from one another. This can be accomplished in various ways, including the use of a carrier material that is a poor conductor of heat, spacing the pellets apart from one another, placing thermal insulation on the carrier between adjacent pellets, coating portions of the pellets with thermally insulating materials, and so on. Suitable thermal insulator materials include silica, silicon dioxide, silicon nitrides, silican carbide, glass, and polymers such as polyimides and epoxy-amine composites.

A feed system feeds the pellet strip to sequentially position pellets, either individually or in groups, in proximity to the heater(s). Various types of feed systems can be used, such as augers, sprockets, ratchet wheels, and rotating belts. In one embodiment the feed system includes a sprocket. For example, teeth on the sprocket can engage or create perforations or indentations along the carrier to feed the pellet strip as the sprocket rotates (e.g., in a manner similar to that of a movie projector feeding film). In another example, the pellets and spaces between them function like the links of a chain that is driven by a sprocket. The feed system can include an indexing mechanism for indexing the pellet strip in increments. An example of an indexing mechanism is a ratchet, which will only allow movement of the drive mechanism in one direction. A ratchet may be mounted on a sprocket, for example.

The ignition system heater heats one or more pellets positioned in proximity to the heater, resulting in a thermal decomposition reaction of the hydrogen containing reactant in the pellet(s). The ignition system can include more than one heater. Multiple heaters can be advantageous when a single heater does not produce sufficient heat, when more than one pellet is to be ignited at one time, when there are more than one stationary pellet, and when the hydrogen generator uses more than one pellet strip for example. Various types of heaters can be used. Examples include resistive heaters, infrared heaters, laser heaters, microwave heaters, semiconductor bridges, and so on.

Alternatively, heating elements can be incorporated into the pellets or into the carrier. Electrical leads from the ignition system can make contact with heating element contacts so current to heat the heating elements is provided when the pellets are positioned in the desired location.

One or more pellets are positioned in close enough proximity to the heater(s) for the heater(s) to heat the pellet(s) sufficiently that the hydrogen-containing reactant releases hydrogen gas. These "proximal" pellets may be spaced apart from the heater(s), or they may make contact with the heater(s).

The heater can heat the hydrogen containing reactant directly, or it can heat an ignition material (a material that will react exothermally, producing the heat necessary for the thermal decomposition reaction of the hydrogen containing reactant). If the heater initiates reaction of the hydrogen containing reactant directly, the heater may provide heat only long enough to start the reaction, if the reaction is self-sustaining, or it may continue to provide heat for the entire reaction time. If an ignition material is used, the ignition material can be disposed within or in contact with a pellet, the ignition material can be a separate layer of the pellet (i.e., separate from a layer containing the hydrogen containing reactant), or the ignition material can be mixed with the hydrogen containing reactant.

Examples of ignition materials (some of which can also contribute to the hydrogen yield) include thermite ($Fe_2O_3$ plus Al), iron powder plus $KClO_4$, $TiH_2$ plus $KClO_4$, $MnO_2$ plus $LiAlH_4$, Ni plus Al, Zr plus $PbCrO_4$, and $LiAlH_4$ plus $NH_4Cl$.

The hydrogen generator can include a waste zone for accumulating decomposing pellets, spent pellets and any residue (e.g., carrier material, ashes or other reaction or combustion byproducts) from the pellet strip. The waste zone can be separated from the pellet strip storage compartment by a wall. The wall can be a moving wall that defines a portion of the storage compartment. The wall can move as the pellet strip is consumed, thereby reducing the size of the storage compartment and increasing the size of the waste area. If the hydrogen generator includes more than one storage compartment, it can include a waste zone for the pellet strip in each compartment, or a single waste zone can be associated with more than one storage compartment. When the storage compartment is defined by a moveable wall, a portion of the feed system (e.g., a feed sprocket) can be moveable together with the moveable wall.

Operation of the optional feed system, the ignition system or both can be controlled in various ways. A control system can be used. The control system can determine the need for hydrogen by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hybrid circuitry; solid state and/or electromechanical switching devices; capacitors, sensing instrumentation, and so on.

The housing of the hydrogen generator is made of a material that will withstand the heat and internal pressure that are produced to maintain desired dimensions and an adequate hydrogen seal. Examples of materials that may be suitable include metals such as aluminum and steel and polymeric materials such as polyphenylene sulfide and acrylonitrile butadiene styrene.

The hydrogen generator can include various filters and/or purification units to remove undesired reaction byproducts and other contaminants from the hydrogen gas. The hydrogen gas can follow a pathway within the hydrogen generator after being released from the mixed metal borohydride fuel source. The fillers and/or purification units can be contained within this pathway or external to the hydrogen generator.

The hydrogen generator can also include various fittings, valves, and electrical connections for providing hydrogen to and interfacing with the fuel cell and/or an electrical appliance being provided with power by the fuel cell system.

The hydrogen generator can include various safety features such as a pressure relief vent to release excessive pressure and a mechanism to stop the feeding of pellets to the ignition system if the internal temperature exceeds an established limit.

The above description is considered that of the preferred embodiments only. Modifications of the invention will occur to those skilled in the art and to those who make or use the invention. Therefore, it is understood that the embodiments shown in the drawing and described above is merely for illustrative purposes and not intended to limit the scope of the invention, which is defined by the following claims as interpreted according to the principles of patent law, including the Doctrine of Equivalents.

The invention claimed is:
1. A method of producing a mixed metal borohydride comprising:
preparing a first precursor solution consisting essentially of a homometallic borohydride compound and a first solvent, the homometallic borohydride being lithium borohydride;

preparing a second precursor solution consisting essentially of a second solvent and a borohydride compound containing one or more metal cations selected from the group of metals consisting of sodium, magnesium, calcium and titanium;

combining the first and second precursor solutions to create a mixture;

forming the mixed metal borohydride in the mixture by stirring the mixture at room temperature; and removing the first solvent and the second solvent from the mixture containing the mixed metal borohydride to produce a solid mixed metal borohydride; and, wherein the second precursor solution consists essentially of the second solvent and sodium borohydride and titanium borohydride and, wherein the solid mixed metal borohydride is $Li_3Ti(BH_4)_6$.

2. The method of claim 1, wherein the first solvent and the second solvent are the same.

3. The method of claim 1, wherein the first solvent, the second solvent, or both is diethyl ether.

4. The method of claim 1,
wherein a third precursor solution is prepared consisting essentially of a third solvent and a third borohydride compound, the third borohydride compound being different from the borohydride compound in the second precursor solution and containing one or more metal cations selected from the group of metals consisting of sodium, magnesium, calcium and titanium, and wherein the third precursor solution is combined with the first and second precursor solutions to create the mixture.

5. The method of claim 1, wherein the second precursor solution consists essentially of the second solvent and one or more of sodium borohydride, magnesium borohydride, calcium borohydride and titanium borohydride.

6. The method of claim 1, wherein the second precursor solution consists essentially of the second solvent and calcium borohydride.

7. The method of claim 1, wherein the solvent is removed from the mixture in vacuo.

8. The method of claim 1, wherein the steps of preparing the precursor solutions are done under argon at room temperature.

9. The method of claim 1, wherein a majority of the solid mixed metal borohydride comprises nanoparticles.

10. The method of claim 1, wherein the solid mixed metal borohydride is coated.

11. The method of claim 10, wherein the solid mixed metal borohydride is coated with an inert material.

12. A method of producing a mixed metal borohydride comprising:
preparing a first precursor solution consisting essentially of a homometallic borohydride compound and a first solvent, the homometallic borohydride being lithium borohydride;

preparing a second precursor solution consisting essentially of a second solvent and a borohydride compound containing one or more metal cations selected from the group of metals consisting of sodium, magnesium, calcium and titanium;

combining the first and second precursor solutions to create a mixture;

forming the mixed metal borohydride in the mixture by stirring the mixture at room temperature; and removing the first solvent and the second solvent from the mixture containing the mixed metal borohydride to produce a solid mixed metal borohydride; and wherein the second precursor solution consists essentially of the second solvent and sodium borohydride and titanium borohydride.

13. The method of claim 12, wherein the solid mixed metal borohydride contains less than 5 atomic weight percent of titanium.

14. A method of producing a mixed metal borohydride comprising:
preparing a first precursor solution consisting essentially of a homometallic borohydride compound and a first solvent, the homometallic borohydride being lithium borohydride;

preparing a second precursor solution consisting essentially of a second solvent and a borohydride compound containing one or more metal cations selected from the group of metals consisting of sodium, magnesium, calcium and titanium;

combining the first and second precursor solutions to create a mixture;

forming the mixed metal borohydride in the mixture by stirring the mixture at room temperature; and removing the first solvent and the second solvent from the mixture containing the mixed metal borohydride to produce a solid mixed metal borohydride; and, wherein the second precursor solution consists essentially of the second solvent and sodium borohydride, calcium borohydride and titanium borohydride.

15. The method of claim 14, wherein the solid mixed metal borohydride contains less than 5 atomic weight percent of titanium.

16. A method of producing a mixed metal borohydride comprising:
preparing a first precursor solution consisting essentially of a homometallic borohydride compound and a first solvent, the homometallic borohydride being lithium borohydride;

preparing a second precursor solution consisting essentially of a second solvent and a borohydride compound containing one or more metal cations selected from the group of metals consisting of sodium, magnesium, calcium and titanium;

combining the first and second precursor solutions to create a mixture;

forming the mixed metal borohydride in the mixture by stirring the mixture at room temperature; and removing the first solvent and the second solvent from the mixture containing the mixed metal borohydride to produce a solid mixed metal borohydride;

wherein the second precursor solution consists essentially of the second solvent and magnesium borohydride; and, wherein the solid mixed metal borohydride is $Li_2Mg(BH_4)_4$.

17. A method of producing a mixed metal borohydride comprising:
preparing a first precursor solution consisting essentially of a homometallic borohydride compound and a first solvent, the homometallic borohydride being lithium borohydride;

preparing a second precursor solution consisting essentially of a second solvent and a borohydride compound containing one or more metal cations selected from the group of metals consisting of sodium, magnesium, calcium and titanium;

combining the first and second precursor solutions to create a mixture;
forming the mixed metal borohydride in the mixture by stirring the mixture at room temperature; and
removing the first solvent and the second solvent from the mixture containing the mixed metal borohydride to produce a solid mixed metal borohydride;
wherein the second precursor solution consists essentially of the second solvent and magnesium borohydride; and,
wherein the solid mixed metal borohydride is $Li_3Mg(BH_4)_5$.

* * * * *